United States Patent

Vazquez, Jr.

[11] Patent Number: 6,053,071
[45] Date of Patent: Apr. 25, 2000

[54] COVER FOR TRANSMISSION LEVER'S HANDLE

[76] Inventor: Michael Vazquez, Jr., 360 Ridgewood Rd., Key Biscayne, Fla. 33149

[21] Appl. No.: 09/109,311

[22] Filed: Jun. 30, 1998

[51] Int. Cl.[7] .............................. B62K 21/26; A45C 1/00
[52] U.S. Cl. .............................. 74/551.9; 74/563; 74/558; 74/558.5; 74/543; 74/557; D12/114; 150/155
[58] Field of Search .................... 74/551.9, 557, 74/558, 558.5, 563, 543; D12/144; 150/154, 155, 160

[56] References Cited

U.S. PATENT DOCUMENTS

| | | | |
|---|---|---|---|
| D. 341,562 | 11/1993 | Minniefield | D12/114 |
| 1,356,572 | 10/1920 | Vosburgh | 74/551.9 |
| 1,862,964 | 6/1932 | Lilligren | 74/543 |
| 2,449,575 | 9/1948 | Wilhelm | 74/557 |
| 2,776,582 | 1/1957 | Blades | 74/563 |
| 2,997,089 | 8/1961 | Amdur et al. | 150/52 |
| 3,343,578 | 9/1967 | Rubin | 150/52 |
| 4,523,745 | 6/1985 | Killman | 5/424 X |
| 4,651,461 | 3/1987 | Williams | 43/23 |
| 4,659,144 | 4/1987 | Reese | 150/154 |
| 4,869,305 | 9/1989 | Jones | 150/155 |
| 5,501,120 | 3/1996 | Kikuchi et al. | 74/543 |
| 5,773,802 | 6/1998 | Graves | 219/759 |

*Primary Examiner*—Vinh T. Luong
*Attorney, Agent, or Firm*—J. Sanchelima

[57] ABSTRACT

A cover for transmission levers for vehicles that are pivotally mounted at one end and the distal end includes a handle. A sac assembly with a double liner covers the handle and with an engagement assembly at the opening of the sac assembly it is removably mounted over the handle. Another embodiment includes an engagement assembly that uses a threaded tubular member that is removably mounted to the threaded distal end of the lever. In both embodiments a compartment is provided with granular material contained therein. A relatively soft object results with still sufficient rigid characteristics to transmit the force applied by a user to shift the gears. The sac assembly also provides desirable gripping qualities to permit a user to dissipate his anxiety and stress.

3 Claims, 1 Drawing Sheet

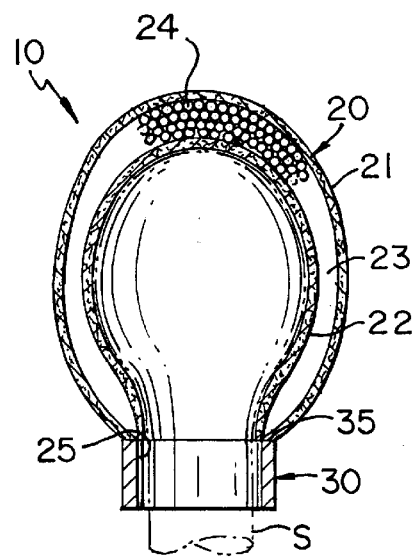
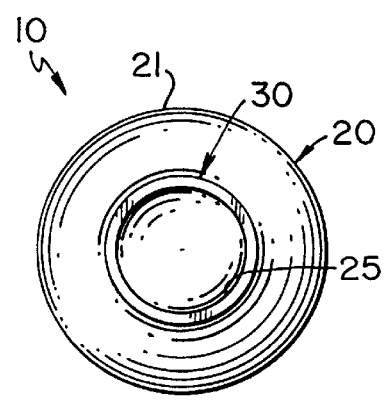
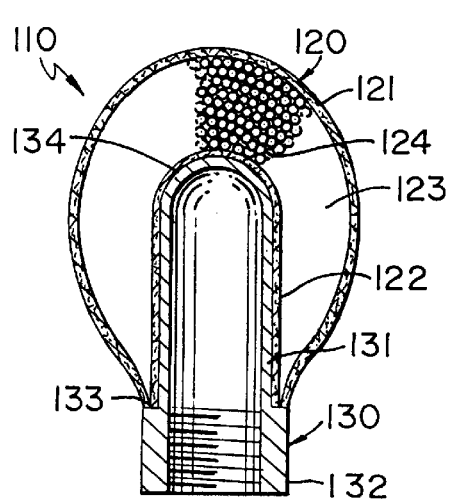
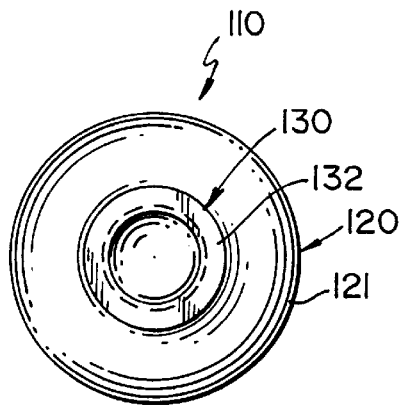

COVER FOR TRANSMISSION LEVER'S HANDLE

BACKGROUND OF THE INVENTION

1. Field of the Invention

The present invention relates to a cover for transmission levers' handles.

2. Description of the Related Art

Bags containing a granular material have been used to ease the user's an anxiety. A user typically applies a grip on these bags and releases it, periodically, and this distracts himself/herself from the source of his/her anxiety.

A driver is exposed to stress and his/her anxiety level increases with traffic. To dissipate at least part of his/her anxiety, a user may apply a grip on the above mentioned bag. However, being a separate object, it may not be available or it may be misplaced when a user needs it. Looking for it while driving may result in a dangerous situation. The present invention ensures the availability of a stress-dissipating choice with reach of the user at all times while preserving the functionality of the handle. Additionally, the typical hard surface of the handle is replaced with a relatively soft object which is desirable in the event of an accident.

SUMMARY OF THE INVENTION

It is one of the main objects of the present invention to provide a cover for transmission levers handles with an inner liner defining a relatively soft and flexible compartment wherein particulate material is contained thereby permitting a user to grab it applying pressure.

It is another object of this invention to provide a cover for transmission lever handles that is squeezable providing a user the effect popularly known as "stress ball".

It is still another object of the present invention to provide a cover for transmission lever handles that is removably mounted thereto.

It is yet another object of this invention to provide such a device that is inexpensive to manufacture and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which:

FIG. 1 is an elevational cross-sectional view of the preferred embodiment.

FIG. 2 is a bottom view of the present invention.

FIG. 3 is an elevational view cross-sectional view of an alternate embodiment.

FIG. 4 is a bottom view of the embodiment shown in FIG. 3.

DETAILED DESCRIPTION OF THE PREFERRED EMBODIMENT

Referring now to the drawings, where the present invention is generally referred to with numeral 10, it can be observed that it basically includes sac assembly 20 mounted to engagement assembly 30.

As illustrated in FIG. 1, sac assembly 20 comprises outer and inner liner members 21 and 22, respectively. Liner members 21 and 22 define compartment 23 wherein particulate material 24, such as seeds, silicon or equivalent, is housed. Outer liner member 21 is preferably made out of a soft material to provide a user a soft grip but still capable, when pushed, to transmit the force applied to the actuating head of transmission lever handle S. Thus, resulting also in a softer handle that prevents injury compared with an otherwise hard object. The user grabs cover 10 to relief stress, similar to the popular "stress balls", with the advantage that he or she will find it where most of the daily stress is created, namely, in traffic. Inner liner member 22 coats the actuating head of transmission lever handle S. The open end of sac assembly 20 defines opening 25 is mounted to rim 35 of stretchable elastic tubular member 31 of engagement assembly 30 in one of the preferred embodiments. The present invention can be used with most transition levers that include a substantially round handle by inserting it through member 31 and into liner member 22.

Alternate embodiment 110 is illustrated in FIGS. 3 and 4. Cover assembly 110 basically comprises sac assembly 120 mounted to threaded tubular member 132 of engagement assembly 130. Similar to embodiment 10, sac assembly 120 comprises outer and inner liner members 121 and 122, respectively. Liner members 121 and 122 define compartment 123 that in turn houses particulate material 124.

Engagement assembly 130 includes supporting member 131 coaxially and upwardly extending from threaded tubular member 132. Sac assembly 120 is mounted to shoulder 133 of threaded tubular member 132 in this alternate embodiment. Supporting member 131 extends a sufficient distance to permit the transmission of the force applied by a user when actuating shift stick S. Threaded tubular member 132 is designed to cooperatively mate with the threaded termination of conventional transmission levers. Supporting member 131 has internal rounded termination 134 to make the grip more comfortable to the user.

Another possible application includes the use of an outer and inner liner members covering the steering wheel. Granulated material is deposited in between. A user then applies a grip and releases it to dissipate his/her anxiety.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A cover for a vehicle's transmission lever having two ends, one of said ends being pivotally mounted to said vehicle and having a thread at the distal end, said cover comprising:

a) an engagement assembly removably mounted to said distal end, and further including a threaded tubular member that cooperatively and removably engages with the thread of said distal end;

b) a sac assembly including inner and outer liner members mounted to said engagement assembly covering said threaded tubular member, said inner liner member being housed within said outer liner member thereby defining a compartment thereinbetween; and c) granular material contained within said compartment.

2. The cover set forth in claim 1 wherein said threaded tubular member includes a shoulder wherein said sac assembly is mounted.

3. The cover set forth in claim 2 wherein said inner liner member covers said threaded tubular member.

* * * * *